United States Patent [19]

Nochebuena

[11] Patent Number: 5,258,869
[45] Date of Patent: Nov. 2, 1993

[54] XEROGRAPHIC LASER LIGHT MODULATION WITH BUILT-IN LIGHT LEVELING USING OPTICAL CIRCULATORS

[75] Inventor: Rogelio F. Nochebuena, Pasadena, Calif.

[73] Assignee: Xerox Corporation, Stamford, Conn.

[21] Appl. No.: 999,348

[22] Filed: Dec. 31, 1992

[51] Int. Cl.⁵ .................................................. G02F 1/09
[52] U.S. Cl. .................................. 359/278; 359/281; 359/284; 359/484; 372/703
[58] Field of Search .............. 359/281, 283, 284, 484, 359/278; 324/244.1; 372/703

[56] References Cited

U.S. PATENT DOCUMENTS

| | | | |
|---|---|---|---|
| 2,974,561 | 3/1961 | Hardy et al. | 359/281 |
| 3,738,755 | 6/1973 | Chaney et al. | 359/281 |
| 3,936,748 | 2/1976 | Bomke | 359/281 |
| 4,027,948 | 6/1977 | Tanton et al. | 359/284 |
| 4,079,429 | 3/1978 | Travot et al. | 359/281 |
| 4,449,096 | 5/1984 | Doriath et al. | 359/281 |
| 4,540,937 | 9/1985 | Asars | 359/281 |
| 4,697,145 | 9/1987 | Doriath et al. | 359/281 |

*Primary Examiner*—Martin Lerner
*Attorney, Agent, or Firm*—Nola Mae McBain

[57] ABSTRACT

An optical system in which optical circulators with polarization plates are used for light modulation of plane polarized light waves. The light modulation is used for black and white printing, grey scale printing and for adjustment of beam intensity of plane polarized light waves.

2 Claims, 4 Drawing Sheets

XEROGRAPHIC LASER LIGHT MODULATION WITH BUILT-IN LIGHT LEVELING USING OPTICAL CIRCULATORS

BACKGROUND

This invention relates generally to the applications of optical circulators and more particularly concerns a printing device in which an optical circulator is used for laser light modulation and light leveling.

A conventional raster output scanner utilizes a light source, a modulator and a multi-faceted rotating polygon mirror as the scanning element. The light source, which can be a laser source, produces a light beam and sends it to the modulator. The modulator receives pixel information for modulating the light beam. The modulated light beam will be directed onto a rotating polygon. At the strike of the modulated light beam, the rotating polygon reflects the modulated light beam and causes the reflected light beam to revolve about an axis near the center of rotation of the rotating polygon and scan a straight line. This reflected light beam can be utilized to scan a document at the input of an imaging system or can be used to impinge upon a photographic film or a photosensitive medium, such as a xerographic drum at the output of the imaging system.

Conventional modulators utilize acousto-optic modulation techniques. The acousto-optic modulator is fabricated from a crystal substrate, such as Lithium Niobate, and then must have electronics bonded to it. The fabrication of the acousto-optic modulator is complex, time consuming, and expensive with relatively low yields of parts. The acousto-optic modulators require complex drivers using between 25 and 50 components and a large power output to modulate light. Additionally, acousto-optic modulators are light polarization sensitive.

On low end printing devices liquid crystal devices are utilized to manufacture low cost print heads. However, liquid crystal devices not only require complex circuitry drivers but also have inherently long response times which limit the printing resolution to about 300 dots per inch and the throughput to less then 24 pages per minute.

Accordingly, it is the primary aim of the invention to provide a method of modulating a light beam requiring fewer complex parts and not limited to slow printing applications.

Further advantages of the invention will become apparent as the following description proceeds.

SUMMARY OF THE INVENTION

Briefly stated and in accordance with the present invention, there is provided an optical system in which optical circulators with polarization plates are used for light modulation of plane polarized light waves. The light modulation is used for black and white printing, grey scale printing and for adjustment of beam intensity of plane polarized light waves.

While the present invention will be described in connection with a printing device, it will be understood that it is not intended to limit the invention to printing devices. On the contrary, it is intended to cover all alternatives, modifications and equivalents as may be included within the spirit and scope of the invention as defined by the appended claims.

| Alpha-Numeric List of Components | |
|---|---|
| rotation angle | A |
| light propagation direction | d |
| propagation direction | d1 |
| propagation direction | d2 |
| optical circulator | 10 |
| coil | 12 |
| crystal | 14 |
| plane polarized beam of light | 16 |
| source | 18 |
| plane polarized beam | 20 |
| plane polarized beam | 22 |
| laser | 24 |
| polarization plate | 26 |
| optical modulator | 28 |
| printing system | 30 |
| Pre-polygon optics | 32 |
| rotating polygon | 34 |
| Post-polygon optics | 36 |
| photoconductor | 38 |
| coil | 40 |
| laser | 41 |
| plane polarized light | 42 |
| beam | 43 |
| laser | 44 |
| polarization plate | 46 |
| semi-silvered mirror | 48 |
| photodiode light detector | 50 |
| feedback circuitry | 52 |
| differential amplifier | 54 |
| subtractor | 56 |
| voltage control oscillator | 58 |
| automatic gain control | 60 |
| signal mixer | 62 |
| output amplifier | 64 |
| signal | 66 |
| reference voltage signal | 68 |
| signal | 70 |
| signal | 72 |
| signal | 74 |
| signal | 76 |
| modulation signal | 78 |
| signal | 80 |
| signal | 82 |
| analog sampling switch | 84 |
| signal | 86 |

DETAILED DESCRIPTION OF THE INVENTION

Figure 1:
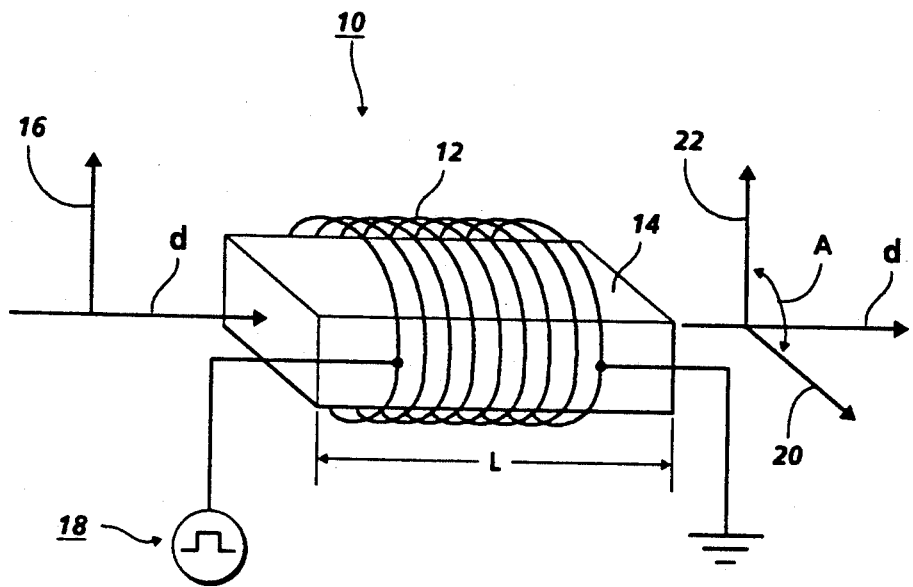
FIG. 1 is a general view of an optical circulator.

Turning now to FIG. 1, an optical circulator 10 is represented. Optical circulators operate using an intense electromagnetic field generated in this Figure by a coil 12 wrapped around a crystal 14. When a plane polarized beam of light 16 propagates through a material subjected to a strong magnetic field applied parallel to the light propagation direction d, rotation of the polarization angle results. The rotation angle A is described by the equation $$A = V H_x L$$

where V is the Verdet constant expressed in the terms of rad/(G)(cm), $H_x$ is the magnetic field strength along the propagation direction, and L is the length of the crystal 14. This phenomenon is called Faraday rotation.

The response time of the optical circulator 10 is very fast when a pulse is applied from a source 18 to the optical circulator 10. Response times under 0.5 ns are possible. The response time of liquid crystal shutters are on the order of 10 ns even when state of the art ferro-electric liquid crystals are used.

When no pulse is present from source 18, the plane polarized beam of light 16 passes through the optical circulator essentially unchanged exiting as plane polarized beam 22 polarized in the same direction as the plane polarized beam of light 16. When the optical circulator 10 is subjected to a pulse of electromagnetic energy from a source 18 the plane polarized beam of light 16 passing through the optical circulator 10 will be rotated by a fixed amount defined by rotation angle A resulting in plane polarized beam 20 exiting the optical circulator 10.

Figure 2:
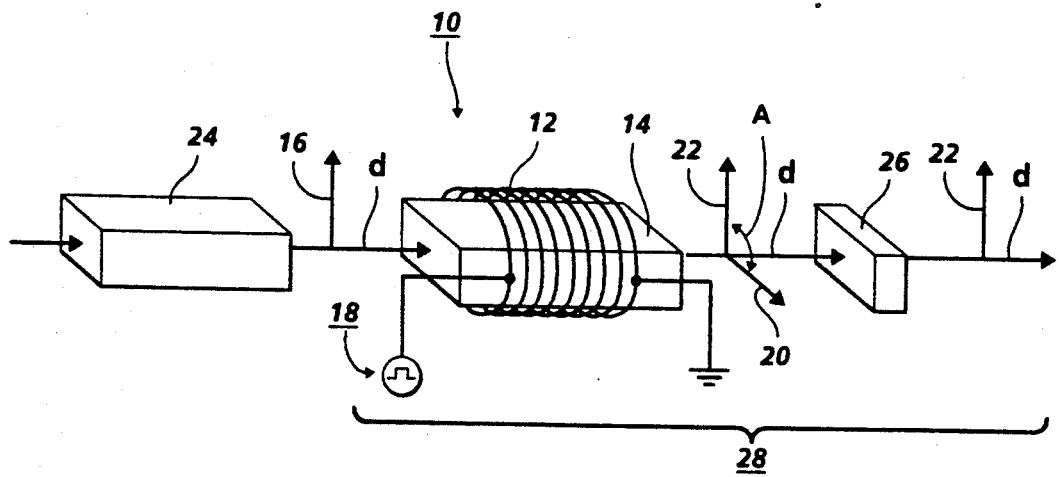
FIG. 2 is a schematic view of the optical circulator of FIG. 1 used in a light modulator.

FIG. 2 illustrates a simplified light modulation system utilizing an optical circulator 10 in place of either an acousto-optic modulator or a liquid crystal shutter.

A laser 24 emits a plane polarized beam of light 16 which passes through the optical circulator 10. The coil 12 around the optical circulator is used to generate the intense magnetic field around the optical circulator 10 necessary for operation. The coil 12 may be directly attached to the source 18 generating the pulses that represent when plane polarized beam of light 16 should be rotated or not.

When no magnetic field is generated by the coil 12 the plane polarized beam of light 16 passes through the optical circulator 10 unchanged as plane polarized beam 22. A polarization plate 26 is aligned to the plane polarized beam 22 so that the plane polarized beam 22 passes through the plate.

If a pulse is present on the coil 12 creating an electric field in the coil 12 around the optical circulator 10, the optical circulator 10 will rotate the polarization of the plane polarized beam of light 16 by 90 degrees as the plane polarized beam of light 16 passes through the optical circulator 10 to emerge as plane polarized beam 20. After plane polarized beam 20 exits the optical circulator 10 the plane polarized beam 20 will strike the polarization plate 26. The plane polarized beam 20 is unable to pass through the polarization plate 26. Therefore, no light will pass through the polarization plate 26. In effect, the plane polarized beam of light 16 will have been turned off. The optical circulator 10, source 18, and the polarization plate 26 together function as an optical modulator 28 since together they determine whether a beam will propagate, the "on" state, or will be stopped, the "off" state.

Figure 3:
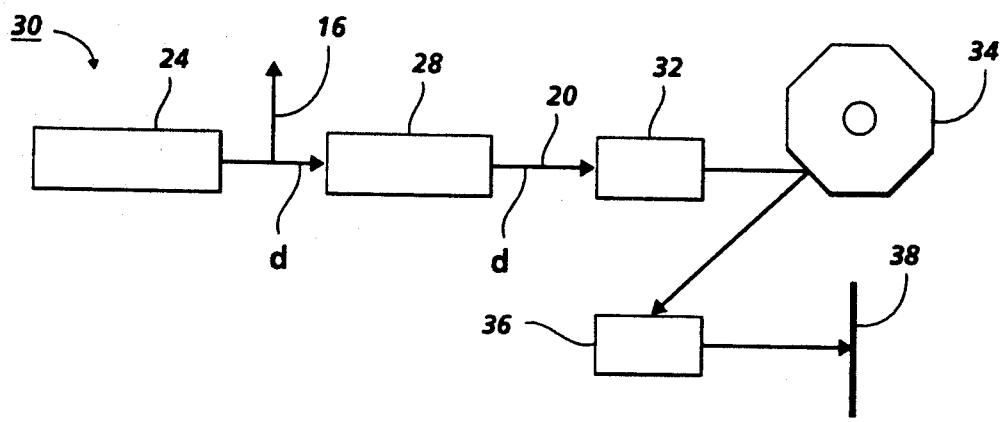
FIG. 3 is a schematic view of the light modulator in FIG. 2 used in a raster output scanner.

This optical modulator 28 can be used to modulate a laser beam in a printing system 30. A typical printing system 30 is illustrated in FIG. 3. The laser 24 emits a plane polarized beam of light 16 which enters the optical modulator 28 described above. The plane polarized beam of light 16 exits the optical modulator 28 as plane polarized beam 22. Pre-polygon optics 32 direct the beam onto a rotating polygon 34. The rotating polygon 34 causes the beam to shift or scan. Post-polygon optics 36 direct the scanning beam to a photoconductor 38. The pre-polygon optics 32 and the post-polygong optics 36 act to focus the beam 20 onto the photoconductor 38.

Since, the amount of rotation of the plane polarized light is proportional to the magnetic field strength, a smaller magnetic field produces a smaller rotation.

Figure 4:
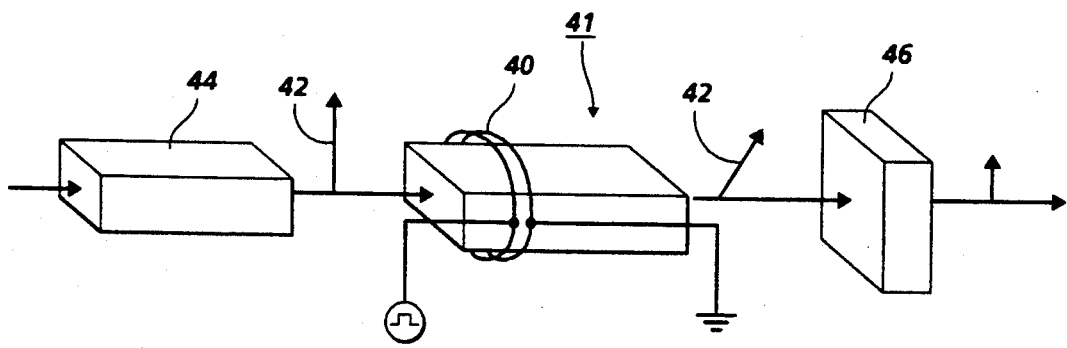
FIG. 4 is a general view of the optical circulator in FIG. 1 used to adjust the intensity of a light beam.

A small, constant rotation of light can be induced by installing a small coil 40 on an optical circulator 41 as shown in FIG. 4. A plane polarized light 42 exits a laser 44 and enters an optical circulator 41. The coil 40 is small and will generate a small angle of rotation in the plane polarized light beam 42 when it exits the optical circulator 41. When the plane polarized light 42 passes through the polarization plate 46, a small portion of light will not be passed through due to the difference in alignment of the polarization plate 46 to the plane polarized light 42. The intensity of the plane polarized light 42 has now been reduced by a small amount.

This same effect can be accomplished by varying either the amplitude or the frequency of the pulse through the coil 12 of the embodiment of FIG. 1. Variations in the frequency of the pulse through coil 12 will vary the strength of the magnetic field. The variations in the magnetic field will induce small rotation angle variations in the polarized light beam 42 analogous to those described above and are useful for adjusting beam intensity.

Variations in the amplitude of the pulse are directly proportional to variations in the rotation angle A. An amplitude reduced by ½ will induce a rotational angle reduced by ½. If a full rotation angle A is 90 degrees and results in no light propagating through the polarization plate 26, then a reduction by ½ results in a rotation angle A of 45 degrees and results in ½ the light propagation through the polarization plate 26. This technique can be used to enable gray scale printing by directly varying the amplitude of the pulse according the darkness of the desired printed mark or to adjust from beam intensity.

The beam intensity of HeNe lasers varies with variations in temperature, Also, beam intensity varies with the age and use of the HeNe laser. However, for printing purposes a constant output power is required to provide uniform printing.

Figure 5:
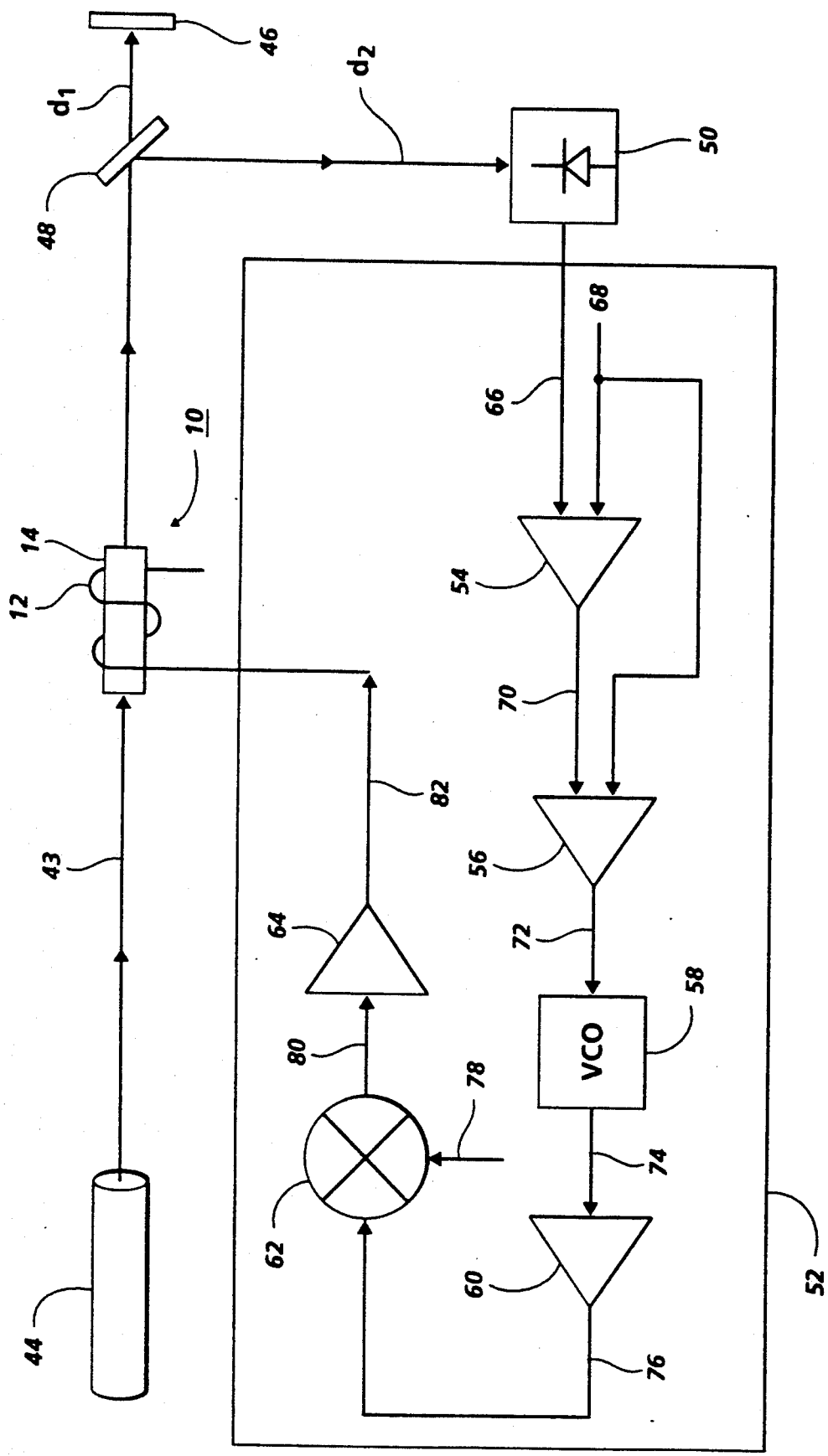
FIG. 5 is a schematic view of a the optical circulator of FIG. 1 used to modulate a light beam and to perform a light intensity adjustment.

FIG. 5 shows a configuration of a system to adjust for variations in intensity of a beam 43. A laser 44 and and optical circulator 10 are utilized with a feedback system including a semi-silvered beam splitter mirror 48, a photodiode light detector 50, and a standard feedback circuitry 52. The feedback circuitry 52 includes a differential amplifier 54, a substractor 56, a voltage control oscillator 58, an automatic gain control 60, a signal mixer 62, and an output amplifier 64.

The semi-silvered mirror 48 passes some light in a light propagation direction d1 and reflects some light along a propagation direction d2. The light propagating in the direction d1 continues through the raster output scanner components as shown in FIG. 3. The light propagating in the direction d2 is received by the photodiode light detector 50. The photodiode light detector 50 provides a signal 66 to the differential amplifier 54. A reference voltage signal 68 is also applied to the differential amplifier 54. The result from the differential amplifier 54, signal 70, is applied to the subtractor 56 along with the reference voltage signal 68. The subtractor 56 subtracts the value of signal 70 from the value of the reference voltage signal 68.

The result of the subtraction operation is signal 72 which is then applied to the voltage control oscillator 58. The reference voltage signal 68 was applied to subtractor 56 to insure that signal 72 will always be a non-zero signal. A non-zero signal is needed since the voltage control oscillator 58 willnot work correctly if a zero value signal is applied to the voltage control oscillator 58. The voltage control oscillator 58 generates a higher frequency signal if the signal 72 is of a higher voltage than the reference voltage signal 68 and a lower frequency signal if the signal 72 is of a lower voltage than the reference voltage signal 68. The output from the voltage control oscillator 58 is a frequency modulated signal 74 which is applied to the automatic gain control 60. The automatic gain control 60 ensures a constant amplitude of a resultant frequency modulated signal 76 since the frequency modulated signal 74 from the voltage control oscillator 58 will also vary in amplitude. The automatic gain control 60 is known circuitry used extensively in television and radio applications. Signal 76 is then applied to a balanced signal mixer 62 which mixes the signal 76 with a modulation signal 78.

The modulation signal 78 carries information about a desired status of the laser 44 with respect to the photoconductor 38 using amplitude modulation of the modulation signal 78. The information describes whether the beam should propagate through the optical circulator 10, the semi-silvered mirror 48 and the polarization plate 26 to the photoconductor 38 or not. The signal 78 may also carry gray scale printing information. The result from the signal mixer 62, signal 80, carries the information about propagation of the beam from the laser 44, and possibly gray scale information, from the modulation signal 78 and information about the beam intensity from signal 76. Signal 80 is passed through an output amplifier 64 before propagation as signal 82 to the coil 12 of the optical circulator 10.

The response of the optical circulator 10 to the signal 82 can be broken into two parts. The optical circulator 10 responds to the amplitude modulation information originally from signal 78 by inducing a large rotation angle A in the polarization direction of the beam as shown in FIG. 2. This large rotation angle A results in the beam not passing through the polarization plate 26. This is identical to the function of the optical circulator 10 and the polarization plate 26 behaving as an optical modulator 28 responsive to a source 18 as shown in FIG. 2. Any gray scale information also carried in the amplitude modulation will be utilized as described in the system shown in FIG. 4.

Referring to the second part of the signal 82, the optical circulator 10 also responds to the frequency modulation originally from signal 76 before it is mixed with the modulation signal 78 in the signal mixer 62. If the voltage control oscillator 58 generates a higher frequency signal 74 the signal 82 will also have a higher frequency. The higher frequency of signal 82 creates a larger magnetic field in the coil 12 of the optical circulator 10. The larger magnetic field in the coil 12 induces a larger rotation angle in the plane polarized light. Conversely, a smaller frequency induces a smaller magnetic field in the coil 12 and results in a smaller rotation angle. However, these variations in rotation angle are smaller than the rotation angle induced by the amplitude modulation of the first part of signal 82. The smaller rotation angle variations are used to adjust the beam intensity just as the optical circulator 10 and the polarization plate 26 as shown in FIG. 4 adjust the beam intensity. Since the feedback circuitry adjust the beam intensity by sampling the current beam and comparing it to a reference voltage, the beam intensity is adjusted to maintain a constant value.

Figure 6:
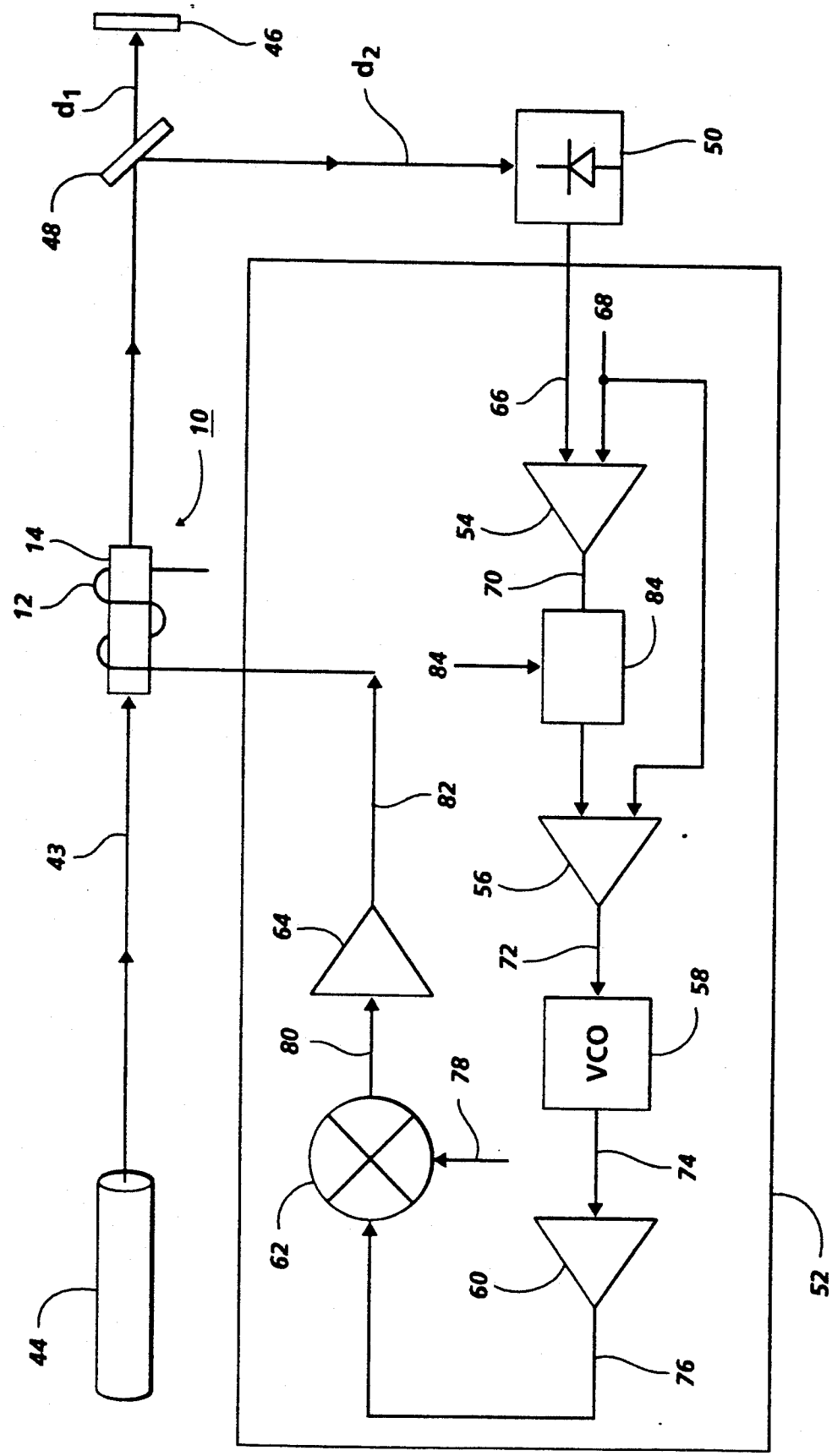
FIG. 6 is a schematic view of the light modulation system in FIG. 5 including a light intensity adjustment switch.

The system shown in FIG. 5 is a constant intensity feedback system. During most normal operations of a printing system, it is not necessary to constantly sample and adjust the beam intensity. Referring to FIG. 6, if an analog sampling switch 84 controlled by a signal 86 is installed between the subtractor 56 and the voltage control oscillator 58 then the beam can be sampled at will. When the switch is turned off by signal 86, only the reference voltage signal 68 will propagate to the voltage control oscillator 58, and signal 74 will be a constant. When the analog sampling switch 84 is turned on by signal 86 then the circuit operates identically to the circuit described in FIG. 5.

I claim:
1. An optical beam modulator system comprising:
   a) a beam polarization rotation means;
   b) a beam modulation information means, said modulation information means being operably connected to said beam polarization rotation means and is amplitude modulation;
   c) a beam intensity feedback means, said beam intensity feedback means being operably connected to said beam polarization rotation means and is frequency modulation;
   d) said beam polarization rotation means being constructed for switching a polarization state of an incident beam between a plurality of polarization positions;
   e) said plurality of polarization positions is at least a maximum on polarization position and a maximum off polarization position and includes a second plurality of polarization positions between said maximum on polarization position and said maximum off polarization position;
   f) said beam polarization rotation means being responsive to said beam modulation information means to switch the polarization state of an incident beam between said maximum on polarization position and said maximum off polarization position and being responsive to said modulation information means to further switch the polarization state of an incident beam between said second plurality of polarization positions.

2. An optical beam modulator system of claim 1 further comprising:
   a) a beam polarization responding means;
   b) said polarization responding means being located to receive a beam from said beam polarization rotation means;
   c) said polarization responding means being constructed to be responsive to the beam polarization positions to permit different amounts of the beam to pass therethrough at each of said plurality of polarization positions wherein said polarization responding permits a maximum amount of the beam to pass therethrough at said maximum on polarization position and to permit substantially no amount of the beam to pass therethough at said maximum off polarization position and said polarization responding means permits a decreasing amount of the beam to pass therethrough as said second plurality of beam polarization positions change from said on polarization position toward said off polarization position.

* * * * *